United States Patent [19]

Takahashi

[11] Patent Number: 4,682,368
[45] Date of Patent: Jul. 21, 1987

[54] MOBILE RADIO DATA COMMUNICATION SYSTEM USING A SPEECH RECOGNITION TECHNIQUE

[75] Inventor: Tsutomu Takahashi, Tokyo, Japan
[73] Assignee: NEC Corporation, Tokyo, Japan
[21] Appl. No.: 716,067
[22] Filed: Mar. 26, 1985
[30] Foreign Application Priority Data Mar. 27, 1984 [JP] Japan ................... 59-57457

[51] Int. Cl.4 ............................................. H04B 7/00
[52] U.S. Cl. ............................................. 455/38; 455/4; 455/21; 455/54
[58] Field of Search ............... 455/33, 21, 9, 38, 54, 455/79; 179/2 EB, 84 VF; 381/41, 43

[56] References Cited

U.S. PATENT DOCUMENTS 4,144,412 3/1979 Ito et al. ................... 455/33
4,247,947 1/1981 Miyamoto ................... 179/2 EB
4,426,733 1/1984 Brenig ........................ 455/79
4,495,647 1/1985 Burke et al. ................. 455/54

Primary Examiner—Jin F. Ng
Assistant Examiner—Elissa Seidenglanz
Attorney, Agent, or Firm—Sughrue, Mion, Zinn, Macpeak & Seas

[57] ABSTRACT

A mobile radio data communication system wherein a fixed unit transmits an operation command code sequence for an instruction to an operator having a portable unit. A speech synthesizer of the portable unit is responsive to the command code sequence to generate a speech signal which is audible to the operator. In response to the audible instruction, the operator replies by voice, and the speech signal is supplied to a speech recognition circuit which sends a code associated with the speech signal to the fixed unit.

6 Claims, 8 Drawing Figures

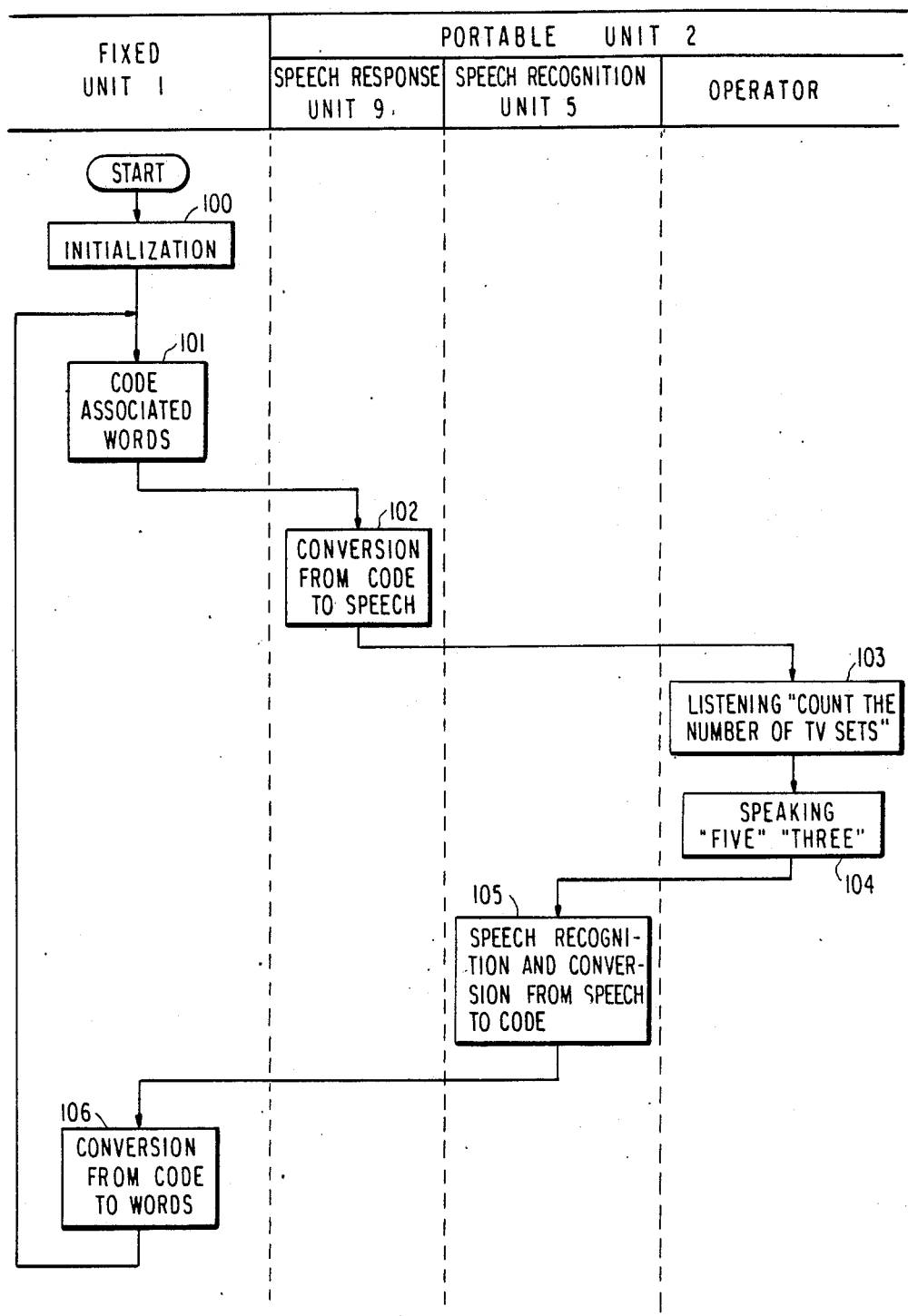

MOBILE RADIO DATA COMMUNICATION SYSTEM USING A SPEECH RECOGNITION TECHNIQUE

BACKGROUND OF THE INVENTION

The present invention relates to a mobile radio data communication system using a speech recognition technique.

Today, a mobile radio data communication system is extensively used to promote rapid processing of various kinds of data handled in business activities such as inventory, sale and production. Especially, a system which utilizes speech is advantageous in that the operation of entering data is simple, compared to a system in which data is keyed in by an operator. A data communication system relying upon speech has been proposed in U.S. Pat. No. 4,247,947 issued on Jan. 27, 1981. The problem encountered with the proposed system is that, since a speech recognition device is installed in a fixed radio unit, speech data undergoes distortions while propagating from a portable unit to the fixed unit and, thereby, fails to be accurately recognized by the fixed unit.

SUMMARY OF THE INVENTION

It is, therefore, an object of the present invention to provide a mobile radio data communication system which solves the problem inherent in the prior art system as described above.

According to one aspect of the invention, there is provided a mobile radio data communication system which allows an operator to input data in the form of a speech signal. The system comprises a fixed unit including a control circuit for controlling generation of an operation command code sequence for an instruction to the operator and for processing the speech signal supplied by the operator in response to the instruction, a first modulator for modulating the operation command code sequence to generate a first modulated signal, and a first demodulator for demodulating a received signal to generate a code associated with the speech signal. The system also comprises at least one portable unit including a speech recognition circuit for recognizing the speech signal and outputting the code associated with the speech signal, a second modulator for modulating the code associated with the speech signal to generate a second modulated signal, a second demodulator for demodulating the first modulated signal to generate the operation command code sequence, a speech synthesis circuit for generating a speech signal associated with the operation command code sequence, and a headset operated by the operator for receiving the speech signal uttered by the operator and receiving the speech signal supplied from the speech synthesis circuit.

BRIEF DESCRIPTION OF THE DRAWINGS

The above and other objects, features and advantages of the present invention will become more apparent from the following detailed description when taken with the accompanying drawings in which:

FIG. 4 shows a flow chart for describing the operation of the system shown in FIGS. 2 and 3;

In the drawings, the same or similar structural elements are designated by like reference numerals; thin lines represent paths for inputting or outputting analog signals or bit-serial signals.

DESCRIPTION OF THE PREFERRED EMBODIMENTS

Figure 1:
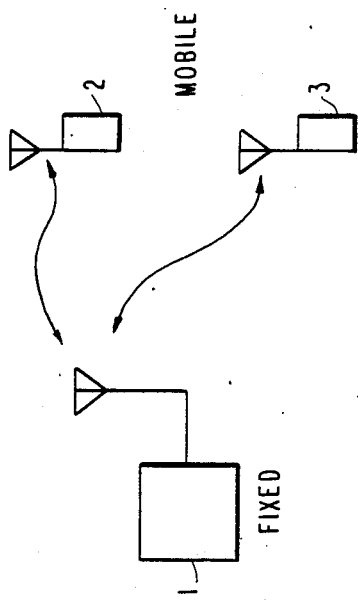
FIG. 1 is a block diagram of the general principles of operation in accordance with the invention.

Referring to FIG. 1, a mobile radio data communication system of the present invention includes a fixed radio unit 1 and portable radio units 2 and 3. Each of the portable units 2 and 3 transmits codes associated with data entered therein in the form of a speech signal to the fixed unit 1, while the fixed unit 1 prints out the received data through a printer and sends operation commands to the portable units.

Figure 2:
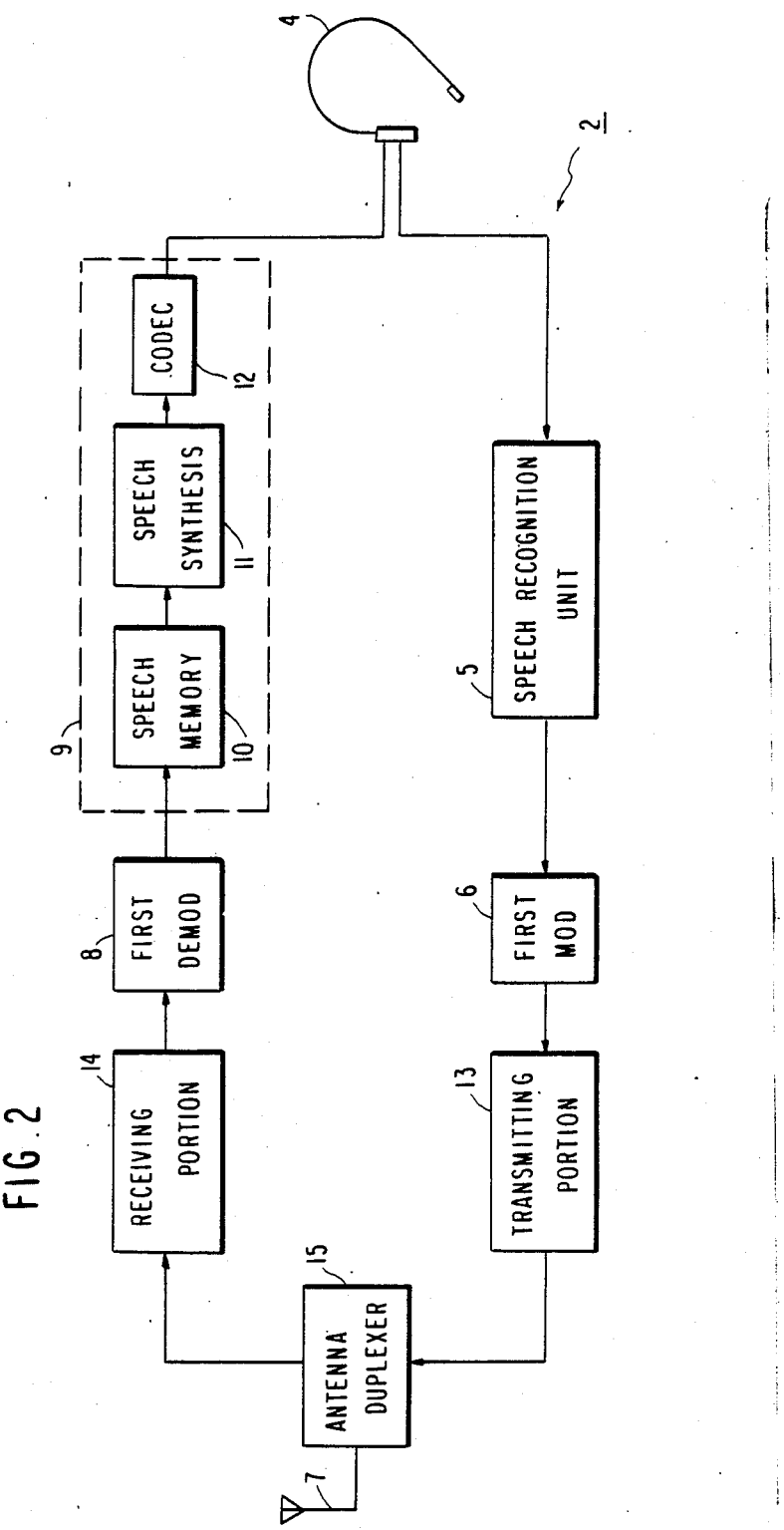
FIGS. 2 and 3 are block diagrams of one embodiment of the invention.

Referring to FIG. 2, the portable unit 2 includes a headset 4 for inputting and outputting speech signal, a speech recognition unit 5 for recognizing the speech signal inputted through the headset 4 to generate a code corresponding to the speech signal. A first modulator 6 modulates (with, for example, phase shift keying or PSK) the code supplied from the speech recognition unit 5. The portable unit 2 also includes a first demodulator 8 for demodulating an operation command code applied to the unit 2 from the fixed unit 1, an audio response unit 9 for synthesizing speech and applying it to the headset 4 in response to the demodulated code. The portable unit 2 also includes for communicating with the fixed unit a transmitting portion 13, a receiving portion 14, and an antenna duplexer 15. The audio response unit 9 is made up of a speech memory 10 storing compressed speech data, a speech synthesis circuit 11 for converting compressed speech data to original or non-compressed speech data, and a coder and decoder (CODEC) 12 for converting the compressed speech data to its corresponding original speech signal. In the structure shown in FIG. 2, the transmitting portion 13, receiving portion 14 and antenna duplexer 15 share the same functions and structures with their associated structural elements disclosed in the previously described U.S. Pat. No. 4,247,947 (71, 95 and 81).

Figure 3:
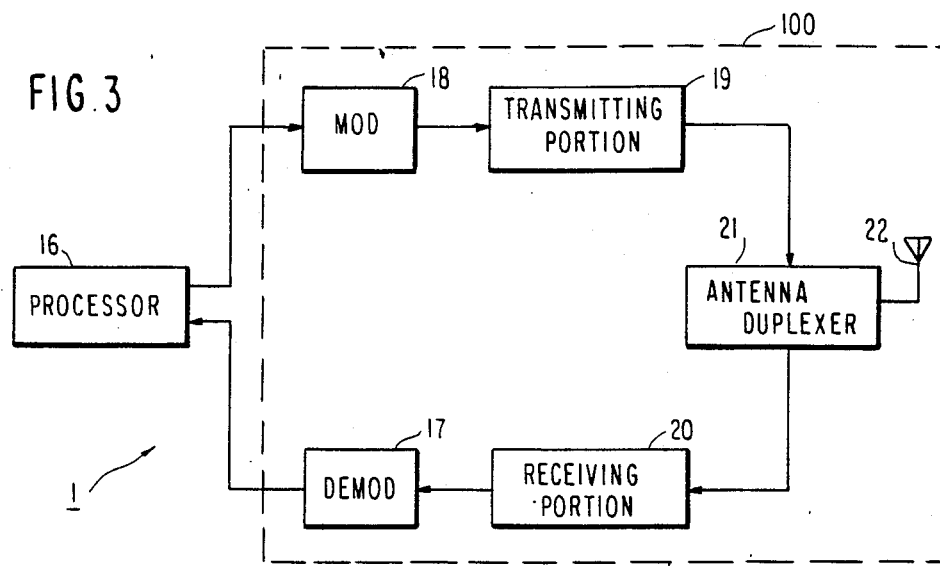

Referring to FIG. 3, the fixed unit 1 comprises a second demodulator 17 for demodulating a signal from the unit 2 into a code, a processor 16 for sending to the portable unit 2 the operation command code and for controlling the unit 1 to print out or store the demodulated signal, and a second modulator 18 for modulating the operation command code from the processor 16 into a PSK waveform. The fixed unit 1 further comprises a transmitting portion 19, a receiving portion 20, an antenna duplexer 21, and an antenna 22 which respectively have the same structures as their corresponding elements also included in the U.S. Pat. No. 4,247,947 (34, 50, 41 and 42). The elements 17–22 shown in FIG. 3 constitute a transmitter-receiver 100 of the fixed unit 1. A structure necessary for setting up a communication channel is described in the mentioned U.S. Pat. No. 4,247,947.

Reference will be made to FIGS. 2, 3 and 4 for describing the operation of the system having the above-discussed system.

First, a communication channel for data transmission is set up between the fixed unit 1 and the portable unit 2 by initialization (step 100 in FIG. 4). This initializing step includes recognition of portable units. In the data communication which will be described, the procedure for confirming the receipt of data is omitted for simplicity. After the channel has been set up, the fixed station 1 sends a predetermined code to the portable station 2 (step 101 in FIG. 4). Specifically, a memory (not shown) inside the processor 16 (FIG. 3) stores codes assigned to the names of various articles and codes associated with words, as tabulated below. In the table, each digit of the code is made up of a combination of ASCII codes or American Standard Codes for Information Interchange.

TABLE

| CODE MADE UP OF ASCII CODES | NAME OF ARTICLE | CODE MADE UP OF ASCII CODES | WORD |
| --- | --- | --- | --- |
| 0001 | TV set | 0050 | the number of |
| 0002 | VTR | 0051 | count |
| 0003 | stereo | | |

Assume a case wherein the fixed station 1 commands the portable station 2 checking the inventory of TV sets. The processor 16 reads the code (0051) assigned to the words "count" out of its memory as well as the code (0050) assigned to the word "the number of" and the code (0001) assigned to the word "TV sets". The codes (0051), (0050) and (0001) are modulated by the modulator 18 (FIG. 3) and, then, transmitted to the portable unit 2 through the antenna 22 (FIG. 3). The portable unit 2 in turn causes its audio response unit 9 (FIG. 2) to convert these codes into the original message "count the number of TV sets" (step 102 in FIG. 4), the message being supplied to the operator via the headset 4 (FIG. 2). In response to the audible command, the operator sees the inventory of TV sets and, then, speaks the result such as "five", "three" (fifty three in single numerals) into the headset 4 (steps 103 and 104 in FIG. 4). This speech entered into the unit 2 through the headset 4 is recognized by the speech recognition unit 5 (FIG. 2) (step 105 in FIG. 4), whereby the codes (05)-(03) associated with the recognized word "five", "three" is transmitted to the fixed unit 1. The fixed unit 1 then converts the received codes (05)-(03) into the original word "five", "three" (step 106 in FIG. 4). The word "five", "three" may be printed out by a printer (not shown) if desired. Thereafter, the processor 16 (FIG. 3) repeats the above procedure (steps 101-106) in order to send codes for checking the inventory of another article to the portable unit 2. In this manner, the system in accordance with the illustrative embodiment causes particular codes associated with speech to be transmitted from the portable unit 2 to the fixed unit 1 and, thereby, allows the fixed unit 1 to detect the codes more accurately than in the prior art speech recognition even if the codes are distorted during transmission.

Figure 5:
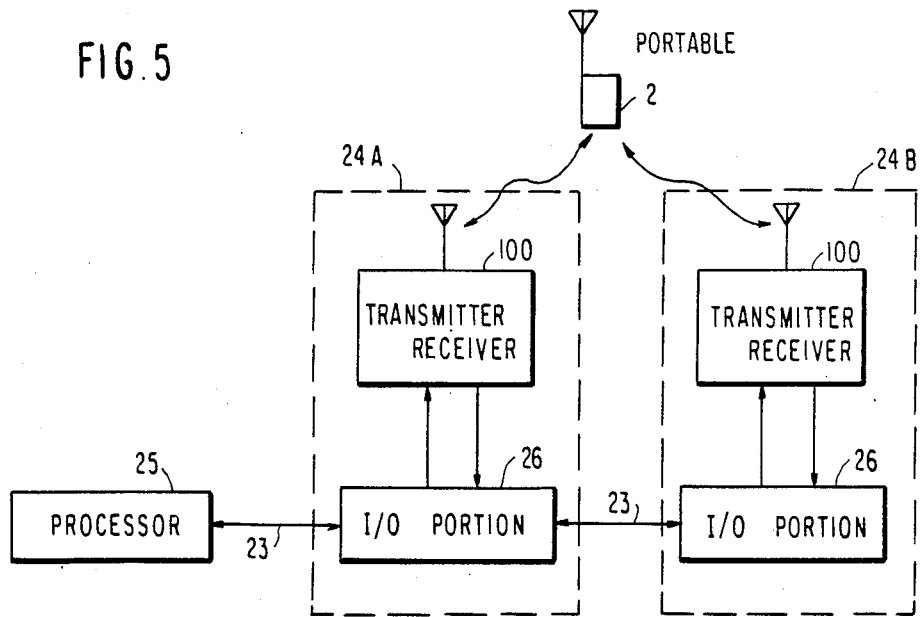
FIG. 5 is a block diagram of another embodiment of the invention.

Referring to FIG. 5, there is shown another embodiment of the invention. This alternative embodiment will prove especially effective when applied to a situation in which radiowaves from portable units cannot reach a fixed station with a sufficient intensity due to the large size of a warehouse or obstacles present in the transmission path. As shown, the fixed station 1 comprises a plurality of repeaters 24A and 24B interconnected by cables 23, and a processor 25 for controlling data communications between the repeaters 24A and 24B and the portable station 2. The repeater 24A is made up of an input/output (I/O) portion 26 for interfacing the repeater 24A to the processor 25, and a transmitter-receiver 100 interconnected to the I/O portion 26 and constructed in the same manner as the transceiver 100 shown in FIG. 3. The processor 25 sequentially polls the repeaters 24A and 24B and controls the repeaters so that one of them which responded to the polling may hold communication with the portable unit 2. The polling operation enables the repeaters 24A and 24B to enter into data communication sharing the same frequency with the portable unit 2. The operation of the system described above and shown in FIG. 5 will be demonstrated hereinafter with reference to FIGS. 6-8.

Figure 7:
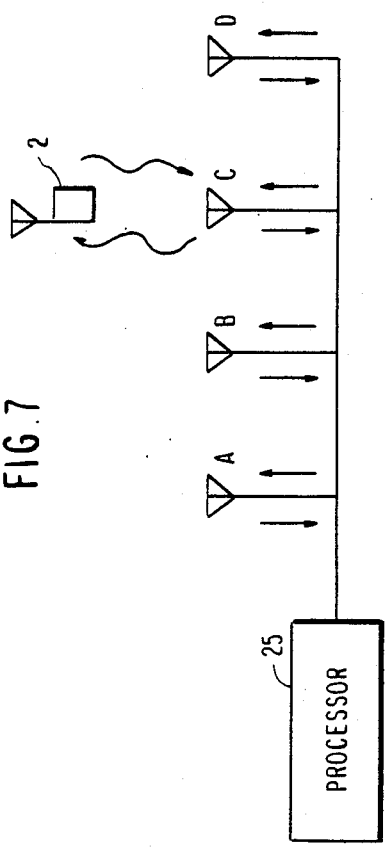
FIGS. 6–8 show the operation of the system of FIG. 5.
Figure 8:
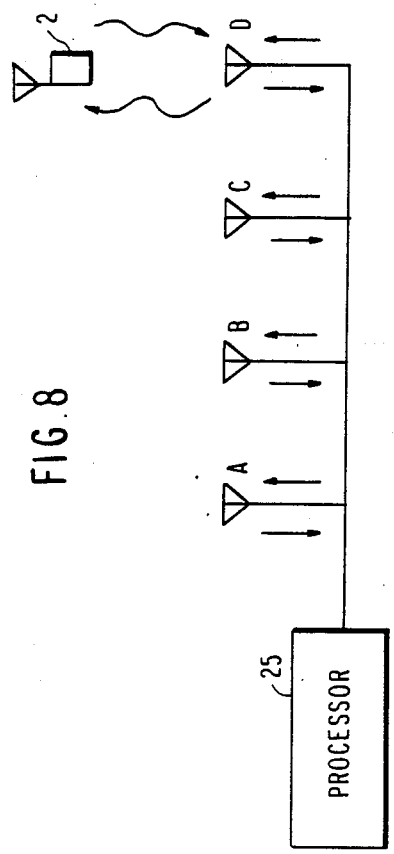
Figure 6:
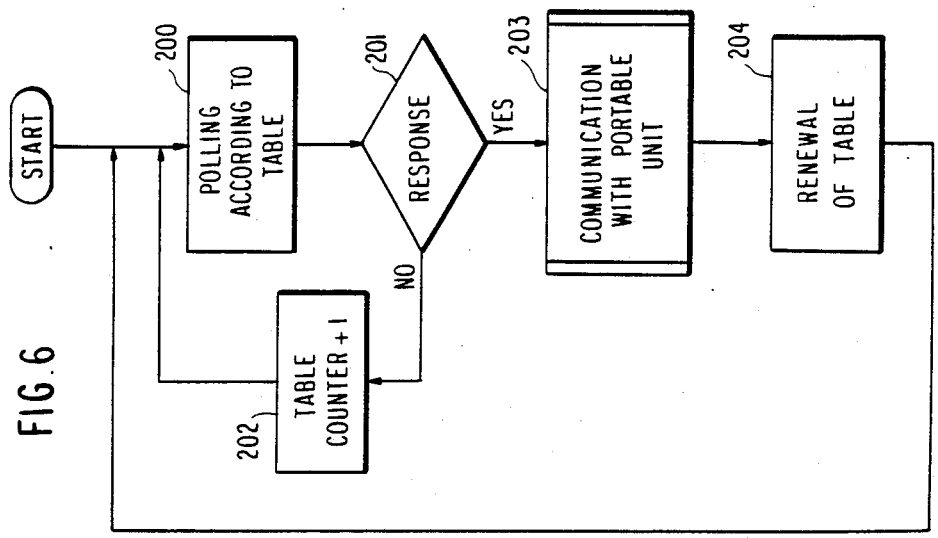

Referring to FIG. 7, let it be assumed that four repeaters A, B, C and D are sequentially polled in this order. First, the processor 25 polls the repeater A (step 200 in FIG. 6) to see if the repeater A sends back a response signal within a predetermined period of time (step 201 in FIG. 6). In this instance, because the portable unit 2 is located in an area which is covered by the repeater C as shown in FIG. 7, the repeater A does not send back a response signal to the processor 25. Then, the processor 25 increments an internal counter thereof by 1 (one) (step 202 in FIG. 6) and polls the next repeater B. Because the repeater B in turn does not return a response signal, for the reason described above, the processor 25 polls the repeater C. This repeater C, covering the portable unit 2 in its area, sends back a response signal to the processor 25 with the result that a communication channel is set up between the unit 2 and the repeater C. The portable unit 2 is now allowed to hold data communication with the fixed unit 1 (step 203 in FIG. 6) following the procedure 100-106 as previously described with reference to FIG. 4. Thereafter, the processor 25 updates a polling table to store a new repeater polling order, C, B, D and A. Specifically, the polling table is updated with priority given to the repeaters B and D which individually cover areas adjacent to the area C, in which the portable unit 2 is currently located. After updating the polling table, the processor 25 returns to the step 200 to restart polling according to the order stored in the table. So long as the portable unit 2 remains in the area covered by the repeater C, it continuously holds the communication link with the fixed unit 1 following the steps 200-204 (FIG. 6). As soon as the portable unit 2 moves from the cover area of the repeater C to an area assigned to the closer repeater D as shown in FIG. 8, the processor 25 detects the movement by polling the repeater D. Then, the polling table is renewed with another repeater polling order, D, C, B and A which are located sequentially further away from the particular area where the portable unit 2 is present in this order.

It will be noted that for the control over a plurality of portable units 2 and 3 use is made of a control technique usually applied to an automobile radio and other radio systems. For example, while the portable unit 2 is at the boundary between the cover area of the nearby repeaters C and D, the processor 25 performs a control such that the unit 2 enters into communication with one of the repeaters C and D which has received a stronger wave than the other.

As described above, the second embodiment of the present invention is capable of achieving data communication by speech in large warehouses or the like.

While the preferred embodiments of the invention have been described above, many modifications and alternatives thereto can be made by those skilled in the art within the scope of the appended claims.

What is claimed is:

1. A data communication system which allows an operator to input data in the form of a speech signal comprising:
    a fixed unit including
        control means for controlling generation of an operation command code sequence for an instruction to said operator and for processing a code associated with a speech signal supplied by the operator in response to the instruction,
        first modulator means for modulating the operation command code sequence to generate a first modulated signal, and
        first demodulator means for demodulating a received signal to generate said code associated with said speech signal; and
    at least one portable unit including
        speech recognition means for recognizing said speech signal and outputting said code associated with the speech signal,
        second modulator means for modulating the code associated with said speech signal to generate a second modulated signal, said second modulated signal being the signal received by said first demodulator means,
        second demodulator means for demodulating the first modulated signal to generate said operation command code sequence,
        speech synthesis means for generating a speech signal associated with the operation command code sequence, and
        a headset operated by the operator for receiving the speech signal uttered by the operator and receiving the speech signal supplied from the speech synthesis means.

2. A mobile radio data communication system as recited in claim 1:
    wherein said fixed unit further includes,
        first transceiving means for transmitting said first modulated signal and for receiving said second modulated signal, and
        a first antenna coupled to said first transceiving means; and
    wherein said at least one portable unit further includes,
        second transceiving means for transmitting said second modulated signal and for receiving said first modulated signal, and
        a second antenna coupled to said second transceiving means.

3. A mobile radio data communication system which allows an operator to input data in the form of a speech signal comprising:
    a fixed unit including
        control means for controlling generation of an operation command code sequence for an instruction to said operator and for processing a code associated with a speed signal supplied by the operator in response to the instruction,
        a plurality of repeater means interconnected by cables and each having first demodulator means for demodulating said received signal to generate a code associated with said speech signal, and
        first modulator means for modulating said operation command code sequence to generate a first modulated signal; and
    at least one portable unit including
        speech recognition means for recognizing said speech signal and outputting said code associated with the speech signal,
        second modulator means for modulating the code associated with said speech signal to generate a second modulated signal,
        second demodulator means for demodulating the first modulated signal to generate said operation command code sequence,
        speech synthesis means for generating a speech signal associated with the operation command code sequence, and
        a headset operated by the operator for receiving the speech signal uttered by the operator and receiving the speech signal supplied from the speech synthesis means.

4. A mobile radio data communication system, as recited in claim 3:
    wherein each said repeater means further includes,
        first transceiving means for transmitting said first modulated signal and for receiving said second modulated signal, and
        a first antenna coupled to said first transceiving means; and
    wherein said at least one portable unit further includes,
        second transceiving means for transmitting said second modulated signal and for receiving said first modulated signal, and
        a second antenna coupled to said second transceiving means.

5. A mobile radio data communication system as recited in claim 3, wherein said fixed unit further includes means for polling said repeaters in a sequence to determine which one of said repeaters is in communication with said at least one portable unit.

6. A mobile data communication system as recited in claim 5, wherein said polling means includes means for reordering said sequence according to the location of said repeaters with respect to said determined repeater.

* * * * *

UNITED STATES PATENT AND TRADEMARK OFFICE
CERTIFICATE OF CORRECTION

PATENT NO. : 4,682,368

DATED : July 21, 1987

INVENTOR(S) : Tsutomu Takahashi

It is certified that error appears in the above-identified patent and that said Letters Patent is hereby corrected as shown below:

Column 6, line 5, delete "speed" and insert therefor --speech--.

Signed and Sealed this

Second Day of August, 1988

Attest:

Attesting Officer

DONALD J. QUIGG

Commissioner of Patents and Trademarks